United States Patent [19]

Victor et al.

[11] Patent Number: 5,363,482

[45] Date of Patent: Nov. 8, 1994

[54] GRAPHICAL SYSTEM AND METHOD IN WHICH A FUNCTION IS PERFORMED ON A SECOND PORTAL UPON ACTIVATION OF A FIRST PORTAL

[75] Inventors: Kenneth E. Victor, Mountain View; Roger Badertscher, Los Altos Hills, both of Calif.

[73] Assignee: Interactive Media Corporation, Los Altos Hills, Calif.

[21] Appl. No.: 197,550

[22] Filed: Feb. 17, 1994

Related U.S. Application Data

[63] Continuation of Ser. No. 825,537, Jan. 24, 1992, abandoned.

[51] Int. Cl.$^5$ .............................. G06F 3/14; G06F 3/00
[52] U.S. Cl. .................................. 395/157; 395/160; 395/159; 395/154; 395/155
[58] Field of Search ............... 395/157, 160, 155, 159, 395/154, 153; 364/188; 345/119, 118

[56] References Cited

U.S. PATENT DOCUMENTS

| | | | |
|---|---|---|---|
| 4,710,763 | 12/1987 | Franke et al. | 395/160 X |
| 4,712,191 | 12/1987 | Penna | 395/159 |
| 4,821,211 | 4/1989 | Torres | 395/160 X |
| 4,920,514 | 4/1990 | Aoki | 395/159 X |
| 4,982,344 | 1/1991 | Jordan | 395/157 |
| 5,109,482 | 4/1992 | Bohrman | 395/154 |
| 5,148,154 | 9/1992 | MacKay et al. | 345/119 |
| 5,159,669 | 10/1992 | Trigg et al. | 395/159 |
| 5,191,645 | 3/1993 | Carlucci et al. | 395/159 |
| 5,206,929 | 4/1993 | Langford et al. | 395/159 |
| 5,212,771 | 5/1993 | Gane et al. | 395/160 |
| 5,237,654 | 8/1993 | Shackelford et al. | 395/160 |

*Primary Examiner*—Raymond J. Bayerl
*Attorney, Agent, or Firm*—Burns, Doane, Swecker & Mathis

[57] ABSTRACT

A graphical system defines a first portal and a second portal; defines a control relationship between the first portal and the second portal; and specifies a function associated with the control relationship such that, when the first portal is activated, the function specified is performed on the second portal.

12 Claims, 2 Drawing Sheets

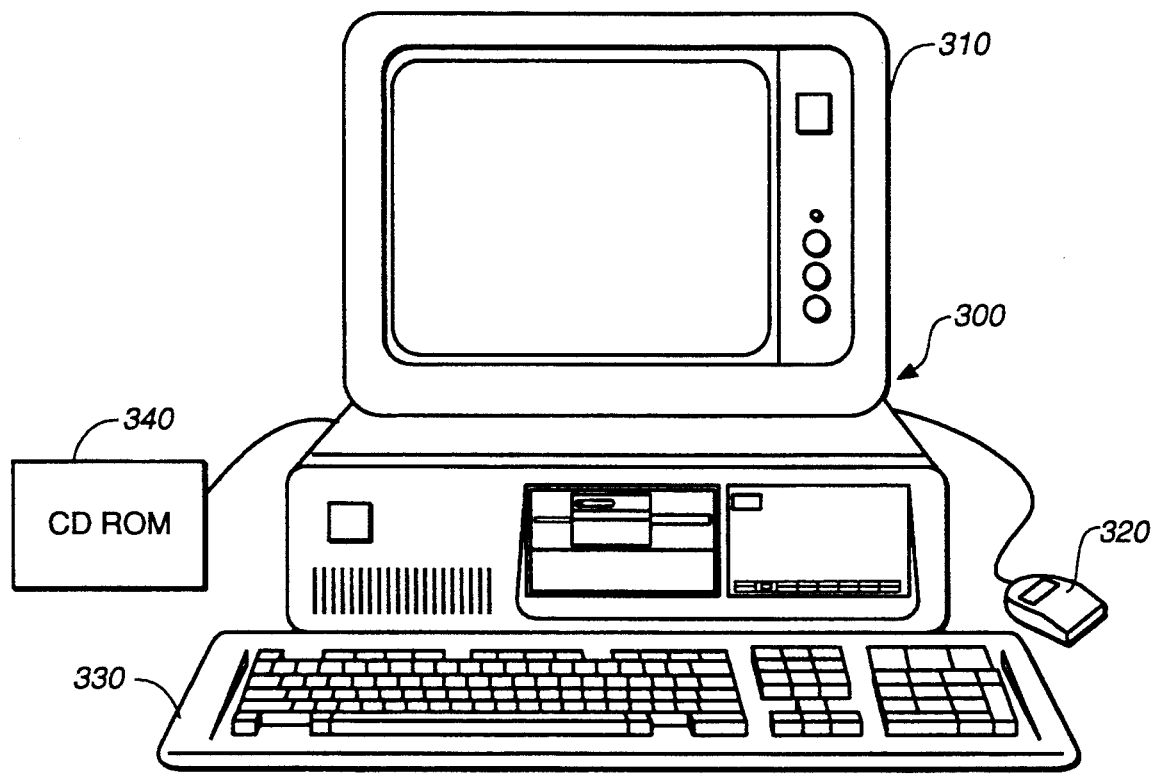
FIG._1
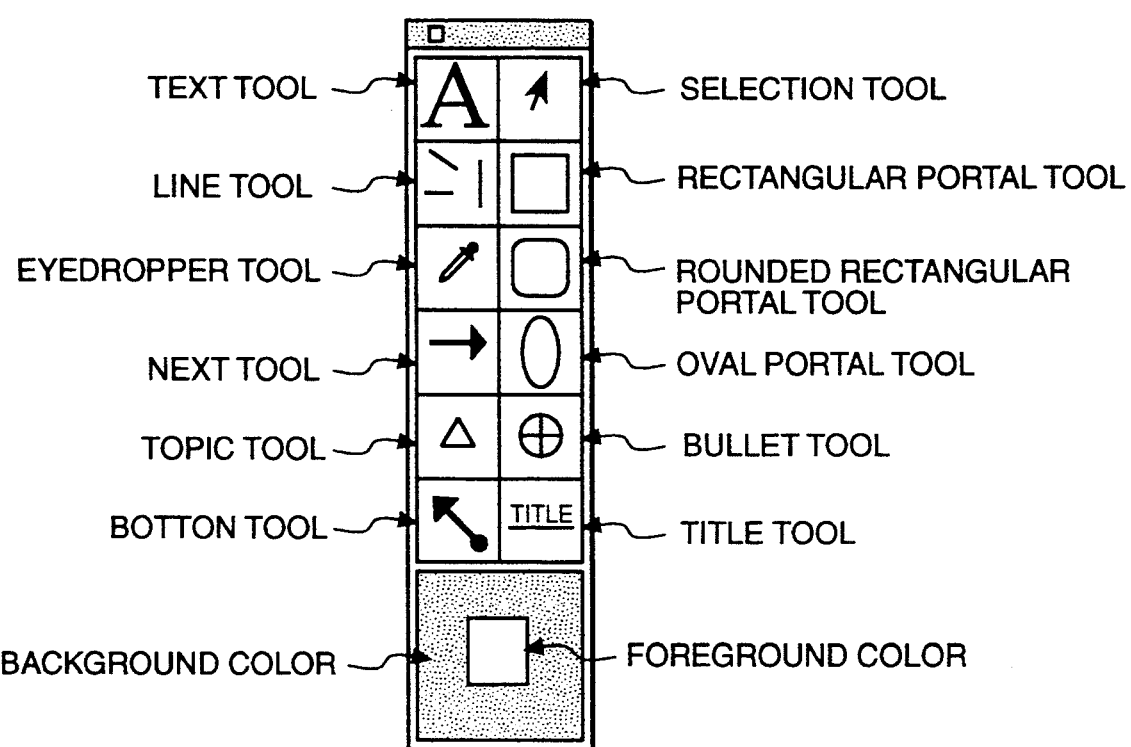
FIG._2

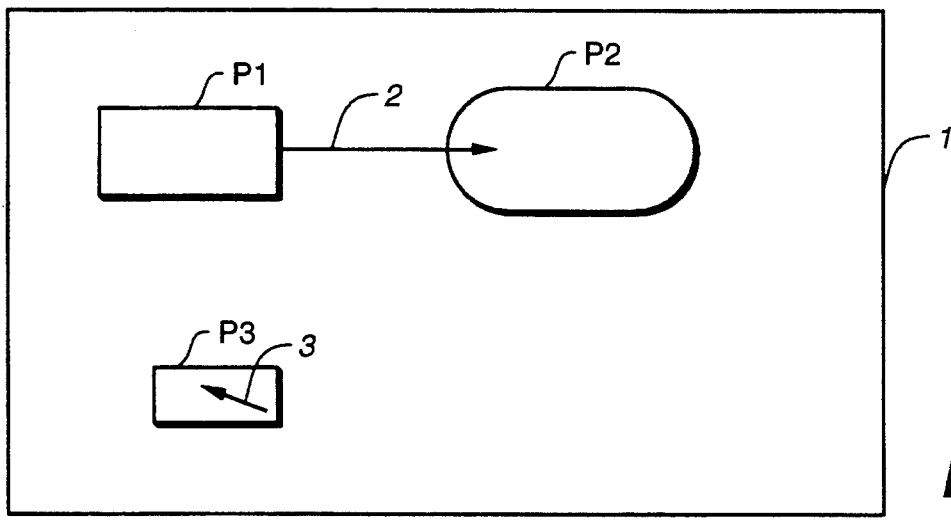
*FIG._3*
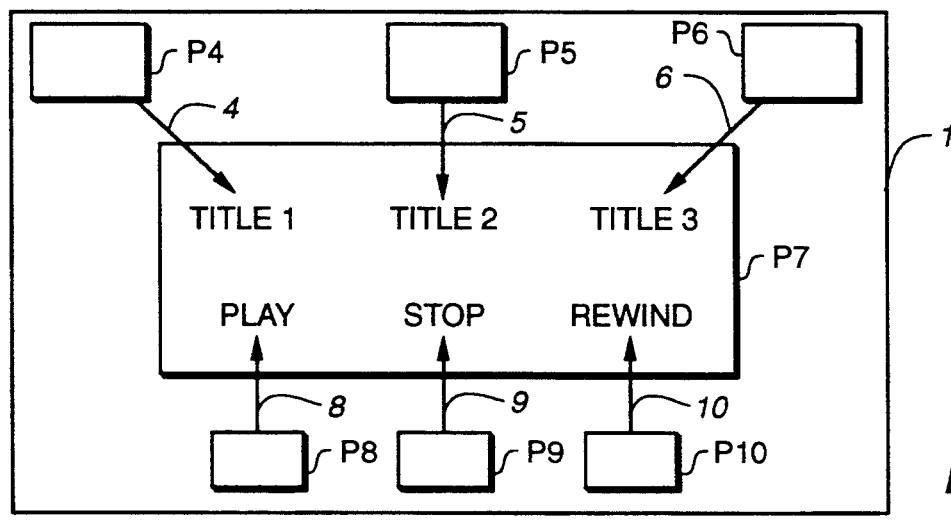
*FIG._4*
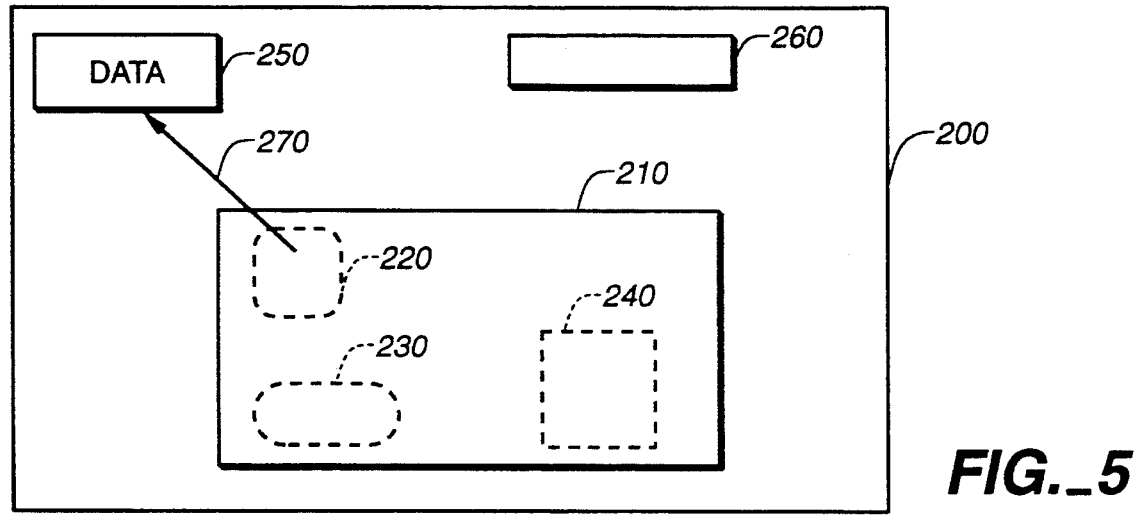
*FIG._5*

GRAPHICAL SYSTEM AND METHOD IN WHICH A FUNCTION IS PERFORMED ON A SECOND PORTAL UPON ACTIVATION OF A FIRST PORTAL

This application is a continuation of application Ser. No. 07/825,537filed Jan. 24, 1992, now abandoned.

FIELD OF INVENTION

The present invention relates to a graphical method and system and, in one particular embodiment, relates to a method for creating and modifying on-line interactive or free-running presentations.

BACKGROUND OF INVENTION

Video presentations are an important means of communication in the business world. In such applications, controlling and organizing presentations is necessary for effectively conveying information.

In prior art systems, limited control of video presentations are available. For example in one system ("MACROMIND"), the user, on-line, initializes a time line in a window on the screen of a display monitor. Specifically, the user with a time wand, perhaps a mouse or light pen, selects an action to occur from a vertical axis including a series of action options and assigns that action to a specific time coordinate along the time line on the horizontal axis. Therefore when the system is operative, as time progresses, the actions are executed in accordance with the initial time set up.

In another prior art method ("AUTHORWARE"), the user writes a flow chart on the screen to define presentation flow and actions are performed in accordance with the flow chart. Thus, if the action selected is to display or not to display something on the screen, the system performs these actions, displaying and not displaying, in the sequence defined by the flow chart.

In another known system ("HYPERCARD"), the user creates stacks of cards having scripts to perform various functions. The user can include various data types (e.g., sound, motion pictures) in the cards. The scripts are set up by the user using a complex scripting language.

The prior art, as described above, has several disadvantages. For example, the ability of the user to alter pre-determined system operation during actual operation is very difficult. Additionally, creating the presentation is also very difficult and requires some level of skill above that of the typical presenter, that is, it requires experts with specific knowledge of the scripting languages used in each system.

The present invention solves the disadvantages of the prior art systems by providing a novel user-friendly graphical interface for creating and modifying presentations.

SUMMARY OF INVENTION

The present invention, generally speaking, provides a graphical system that includes a means for defining a first portal and a second portal, a means for defining a control relationship between the first portal and the second portal, and a means for specifying a function associated with the control relationship such that, when the first portal is activated, the function specified is performed on the second portal.

In one particular embodiment of the present invention, a graphical interface for a data processing system is provided that includes a means for defining a slide, a means for defining first and second portals in the slide, a means for specifying data to be displayed in the second portal, and means for specifying a function to be performed by the first portal when activated. A means is also provided for defining a control relationship between the first portal and the second portals. The term "portal" is used, in this context, to mean a pre-identified area of a slide.

In practice, the system and method of the present invention includes a means for defining a control relationship, a means for drawing an arrow between the first portal and the second portal. In practice, the first portal can be the same as the second portal.

The present invention also encompasses a method for creating a presentation using a data processing system comprising the steps of: defining a first portal and a second portal, defining a control relationship between the first portal and the second portal, and specifying a function associated with the control relationship such that, when the first portal is activated, the function specified is performed on the second portal. Here again, the first and second portals can be defined to be the same.

BRIEF DESCRIPTION OF THE DRAWINGS

The present invention can be further understood with reference to the following description in conjunction with the appended drawings, wherein like elements are provided with the same reference numerals. In the drawings:

FIG. 1 shows a hardware configuration including a processing system and display for using the present invention;

FIG. 2 is a graphical depiction of a Tools menu according one embodiment of the present invention;

FIG. 3 shows control configuration according to the present invention;

FIG. 4 shows an alternative control configuration according to the present invention; and FIG. 5 shows the addition of buttons on a portal according to the present invention.

DETAILED DESCRIPTION OF THE PREFERRED EMBODIMENTS

The system, as will be described below, provides a method and system for interactively creating and conducting an on-line presentation for an audience using either a computer screen with or without some form of projection mechanism. One unit of such presentation has been called a slide. Data, operation functions, drawing tools and other typical computer features are predefined and available for use in defining the presentation. Data includes, for example, sound, video, animations and photographs which can be selected from a menu by the user for defining the slide presentation. Data can also include textual data entered by the person creating the presentation or pre-stored in memory. In one embodiment, pre-stored data is accessed from CD-ROM 340, although other digital data storage devices can be used.

In a preferred embodiment, the system is specifically adapted to the Apple Computer Macintosh (Mac) system environment. However, one skilled in the art could easily apply the same principles and ideas discussed herein to adapt the system to other computer systems such as an IBM ® system or other environments, for example, DOS ®, Windows ®, or UNIX.

An exemplary configuration of a computer system is shown in FIG. 1. The hardware includes a processor 300, a display 310, a mouse 320, a keyboard 330 and a CD-ROM 340.

In the following, the term "presentation" refers to a collection of slides, limited only by available memory in the computer. The presentation is created by the user on a computer with a display such as a display 310. The presentation can then be run on that computer system and displayed in larger format using any of several known projection mechanisms.

A user can have as many presentations open at one time as he desires, limited only by available memory capacity. Each presentation is stored in one file called a presentation file. A presentation file contains some of the data used in a presentation and pointers to other files that contain the remaining data used in the presentation. A presentation is run in a mode referred to as Run View. A presentation can either be an interactive presentation, in which the user is interacting with the system during the running of the presentation, or a self-running presentation, in which the user sets up and stores the presentation and it runs thereafter on its own, with or without interaction from the presenter.

A slide is the basic vehicle for displaying information and is displayed in a window. A slide is edited in a mode called Edit View only when it is open and in the front window. Any number of slides can be open and visible at one time. A slide contains one or more portals and up to one piece of data. Each slide has a title, initially set to "Slide N" where N is a number indicating when the slide was created relative to other slides in the presentation. All slides in a single presentation have the same size. The size, using the Presentation menu (described later), can be varied for any given presentation. For best results, the slide size of the presentation should be set to the screen size of the monitor which will be used for making the actual presentation.

Every time a presentation is created, a slide referred to as a map is automatically created. Each presentation has one and only one map. The map is a special slide, slide O of the presentation. The map contains iconic representations of all the slides in the presentation, including itself. These iconic representations are actually portals. Each icon is also a button that, when selected in Run View, causes the slide represented by the icon to appear.

A portal is an area of a slide defined by the user for holding and/or displaying data. Each portal has certain attributes (e.g., shape, size, location, visibility, button) and can contain one piece of data (i.e. picture, movie, text, title, line). The portals on a given slide are laid out on the screen in a mode referred to as Edit View. Portals can be qualified by the type of data they contain, e.g., a Text Portal is a portal that contains text data, and a Slide Portal is a portal on the map that contains an iconic representation of the slide to which it refers. Since a slide is actually a special type of portal, the term Data Portal is often used to refer to a portal that is part of a slide, as opposed to the slide itself. The shape of a portal is initially defined at the time the portal is created. The size and location of the portal are also defined when the portal is created, but can be changed using known methods.

During a presentation, a user can want to start a movie, stop a movie or perform any of a variety of control functions. To implement such control functions and specify the control and interactive environment, the user creates what are called "buttons". These will be discussed more fully below.

To define a slide presentation, the Presentation menu is entered and a new slide command is selected from the menu. The user then enters Edit View which is the basic mode for laying out the slide. Portals are created in this mode and data to appear in the portals is defined. To create the portals, the Tools menu is accessed and a tool is chosen to draw each portal desired by the user.

The system has four modes of operation: Edit View, Button View, Notes View and Run View. For example, selecting Run View will transfer the user to a run mode and display the current selected slide or a first slide. A menu is available with a list of the title of each slide in the presentation. The user can select different slides in the presentation for operation or editing using this menu. When the system is in Run View, the only valid actions are activating buttons or returning to one of the other modes.

The Tools menu shown in FIG. 2 is a graphical tear off Menu. The Selection tool is used to select portals when in Edit View mode and button links when in Button View mode. The Rectangular Portal tool, Rounded Rectangle Portal tool, and Oval Portal tool are used to draw portals in the corresponding shape. The Eyedropper tool can be used to define foreground and background colors. The Text tool allows the user to enter and edit text in the portals. The remaining tools are discussed herein in their particular applications.

To implement control functions and specify the control and interactive environment, the user enters the Button View mode and accesses the Tools menu and selects the Button tool. The Button tool in Button View is used to create button links that specify the interactivity the user demands for the presentation. When in Button View, a box appears in the lower left corner of the slide's window which is the Slide Init Button. The Slide Init Button is pushed automatically by the system when in Run View before a slide is displayed on the screen.

The Button tool is used to draw button links from a master portal (or the slide or the Slide Init Button) to a slave portal (or slide). For example, a button link can appear as an arrow on the screen from a button or master portal to a controlled or slave portal. In practice, the arrow serves as the means for defining a control relationship between two portals and the second portal; usually, the control function is designated by the label of the arrow. Further in practice, the two portals usually are differentiated by color or style. Other graphical representations, however, can be used to show the control relationship.

In the following, a portal for which the user has defined the button attribute, i.e., a portal from which a button link originates, is referred to as a button portal. A button can have one or more button links originating therein. When a button is pushed (i.e., clicked on by a mouse) in Run View, the button is activated. When a button is activated, all button links emanating from that button are activated one at a time in the order in which they were created. The creation order of a button can be displayed by a number near the arrowhead of each button link. A button link is activated only in Run View when the user activates the master portal (the button) of the button link or in response to activation of the Slide Init button, just prior to the slide being displayed.

An Edit menu is provided which allows access to a number of editing commands for editing slides such as cut, copy and paste, etc. A Format menu is provided for access to various formatting commands, i.e., color, font, size, style and alignment. A View menu is provided which controls the viewing of the slides and windows currently active. A number of other viewing commands are also available through the View menu. Layout View places all open slides in the Layout view, Button View places all open slides in the Button View and Note View places all open slides in the Note View. A Window List provides a list of all open slides and/or windows.

A Presentation menu allows access to Get Presentation Info, Run, Edit Slide, Set Slide Name, and New Slide commands. The Get Presentation Info command lets the user see and set certain presentation attributes, for example, Presentation Slide Size, Run From Finder, and Kiosk Delay. These attributes are discussed below. The Run command allows the user to enter Run View wherein the first slide of the presentation is displayed. Edit Slide allows the user to specify the slide to be edited. The Set Slide Name command accesses a dialogue so that the Title of the slide currently selected can be specified. Changing a slide's name will adjust any location that refers to that slide. According to an exemplary embodiment, a slide name must be one character long and must be unique within a presentation. The New Slide command creates a new slide.

A Portal menu is provided which controls the portals. In the system, each portal is created on a separate layer with the slide being on the bottom most layer. When a new portal is created, a new layer is created on top of all existing layers. If portals overlap, the portal on top will obscure the portal below (unless the top portal is transparent). The portal menu includes a Bring to Front command which makes the selected portal the top/front portal and a Bring Forward command which brings the selected portal one layer closer to the front/top.

The Portal menu also includes Send Backward and Send to Back commands, which send the selected portal one layer closer to the bottom/back and makes the selected portal the bottom/back portal, respectively.

An Adjust command allows modification of the horizontal and vertical size and relative placement of the selected portals. Using this command, the following functions can be accessed: Set Same Size, Align, Distribute and Touch. The Set Same Size command sets the horizontal and/or vertical size of all selected portals to the size of the first portal selected. The Align command moves all selected portals so that the selected edge or center is the same as the first portal selected. The Distribute command sorts the selected portals according to the left (top) or right (bottom) edge or their centers depending on which type of distribution is requested. Use of the Touch command sorts the portals as above and then moves the portals so that the right (bottom) edge of portal N (in the sorted list) just touches the left (top) edge of portal N+1.

FIG. 3 is an example of the button/portal relationship previously described. On screen 1 are three portals P1, P2, and P3. The arrow 2 from P1 to P2 is a button link. Thus, P1 is the button or master portal and P2 is the controlled or slave portal. A slave portal can be the same as the master portal. For example, portal P3 is a button and arrow 3 is a button link originating within P3 for controlling P3. Any portal can be a button, and both the master and/or slave portals can be a slide. Also, the master and slave portals can be the same portal.

After defining the button portals, the user can select the data that is to appear in the portal when the button is activated. Each portal can contain data and can be formatted according to user needs.

A special type of text data exists called Title. The text is actually the title of the slide on which the portal exists. The Title is created using the Title tool from the Tools menu, while in Edit View with the appropriate title portal selected, by clicking on the desired portal.

Another type of data available are lines, which can be drawn with the Line tool. This tool allows the user to prepare a presentation wherein text is displayed and lines are displayed connecting the text.

Data can be manipulated by a variety of commands available in a Data menu including Clip Data to Portal where data in the selected portals is displayed in its natural size, Scale Data to Portal where data in the selected portals is scaled up or down so that it is displayed as the same size of its containing portal, Resize Portal to Data, where the data is displayed in its original size and the portal size changes to become the size of the data bounded by the size limit of the slide, and Anchor where one of nine anchor points (e.g., top left, bottom center) are specified and the corresponding point of the data is placed over the specified point in the portal. Another command in the Data menu, Play, allows the user in Edit view to view a movie and hear the sound of the data in a portal and is particularly useful if one or more of the selected portals holds a movie or sound. In further defining the data, the command Get Data Info permits the user to specify the start and stop frames of a movie or sound clip, and which language sound track of a movie to use, movie volume, movie poster image, and so forth. When a file containing the data to be used by the user is selected, the name of the file is written next to the button link.

QuickTime ® movies are the best suited digital movies for use as data with the Mac application of the system. QuickTime ® offers built-in compression of and a standard format for digital video with sound. A typical QuickTime ® movie playing on a Mac II series machine is 160 by 120 pixels running at 5 to 10 frames per second with an eight-bit mono audio track. QuickTime ® compresses and decompresses still images in ratios up to 25-to-1 using the JPEG (Joint Photographic Experts Group) standard. An animation compressor-decompressor in QuickTime ® plays Mac animations with up to 32-bit color.

The user can also select a PICT file which is a Mac PICT file or a QuickTime ® movie to be shown in a portal. That is, the data defined for the portal is selected to be a PICT (Picture) file or a MooV (Movie) file. This is accomplished using a Place File command from a File menu while in Edit View. When the user selects the Place File command, a version of the QuickTime ® File Dialogue appears. This Dialogue has two buttons on the bottom to allow the user to constrain the displayed files to be only Picture files and/or Movie files.

The File menu also includes standard file commands such as New, Open, Close (slide), Close (presentation), Save, Quit.

FIG. 4 shows an exemplary control representation where seven portals are set up on slide 1 to create a slide that can show several movies and control these movies with VCR-like control buttons that have functions such as stop, play, rewind, and so forth. Portals P4, P5, and P6 are each button portals and are controlling slave portal P7 via button links 4, 5, and 6 respectively. Additionally, portals P8, P9, and P10 are button portals having the VCR-like functions play, stop and rewind, respectively, for controlling slave portal P7 via button links 8, 9, and 10, respectively. Adjacent to the arrowhead of each button link is the data which has been defined to appear in portal P7 when the corresponding button is activated. For example, if button P5 is activated, then Title 2 will appear in portal P7. Likewise, if buttons P4 or P6 are activated then Title 1 and Title 3 will appear in portal P7 respectively. Additionally, if buttons P8, P9 or P10 are activated, the movie indicated by the chosen one of buttons P4, P5, or P6 will be controlled accordingly.

The following navigation functions can be assigned to buttons. Go To displays a specific slide defined by the user, i.e., Go To Slide 3 operates to display slide 3. Next displays the next slide after the current slide being displayed and Previous displays the previous slide. A Pop-Up Go To, when activated, causes a Pop-Up Menu to appear with a list of all the slides in the presentation. The user can then select which slide to display.

Other control functions are also available for assignment to buttons. A Play command plays the movie or sound that is already specified in the slave portal. Likewise, the Stop command stops the movie or sound, Rewind rewinds the movie or sound, Sound Off turns the sound off, Sound On turns the sound on, Increase Volume increases the volume, and Decrease Volume decreases the volume. Other commands are described in connection with other features of the system.

When data is placed in a selected portal when in Button View or Edit View, the command Place File is used to put the data, such as a PICT file or a MooV file, in the portal. In Edit View, the data is associated with the portal such that the data is automatically displayed and started when the slide is selected in Run View. By default, when the data is placed in the portal while in Button View, it becomes associated with the defined button link such that the data is automatically displayed and started in the portal when the button link is activated. A Place command is available through the Button menu to override the default behavior and a Place and Play command returns the button to the default state.

Some commands are specifically directed to the slide. A Slide Pause command pauses all playing movies and sounds on the currently displayed slide and Slide Resume resumes all movies and sounds that were paused. Slide Sound Off and Slide Sound On respectively turn the slide sound off and on.

A Hide Portal command hides the slave portal and disables it from being used as a button. Although the button is not seen, this command differs from a transparent portal where, although the transparent button is not seen it can still be activated. Show Portal shows a previously hidden portal. A Delay command assigned to a button link is used to activate the slave portal of the button link, i.e., it simulates the user activating the button after a certain user defined time delay. The system can be instructed to ignore delays and again accept delays using the Ignore Delays and Accept Delays commands respectively. Quit is also available and when selected returns to the MAC system or to one of the various modes depending on how Run View was entered.

If Run View was entered by way of the Run Command on the Presentation menu, or by way of the Run Window Button, then control is returned to the Edit, Button or Note View of the slide that is displayed when the Quit command is executed. Any other slides that were open when Run View was entered that were viewed while in Run View will be closed. Slides that were open when Run View was entered that were not viewed in Run View will still be open.

Multiple slides can be defined for a single presentation and are linked together in a Next Chain. When a new slide is created it is inserted after the slide that is displayed in the front most window. Thus, the first slide created will be inserted after the map slide. If another new slide is created, it will be inserted following the slide just created. Slides can be moved within the Next Chain to create a desired order. A presentation can contain a number of Next Chains. The Chain that starts with the map is considered the main chain. Next Chains are defined by using the Next tool while the map is in the front most window. Drawing a line from one slide icon portal to another will cause the second slide to be Next after the first slide. To indicate that a slide does not have a Next, a line should be drawn from the slide's icon portal to any place other than another slide's icon portal, outside the source icon portal.

A slide position in a Next Chain is indicated by a number in the top border of its corresponding slide icon view on the map. Chains are indicated by placing a letter in front of the slide's position except for the main chain. The last slide in a chain can point to a slide in the middle of the same or a second chain, and the slides in the second chain will actually be in both chains and the series of position numbers will be identified in the top border of the slide icon. Chains can be circular, e.g., if there is chain O (map slide is O), 1, 2, 3, 4 and the next of the slide in position 4 is the slide at position 2, the borders will be marked O, 1, 2*, 3, 4. A slide which is not in any chain (i.e. a chain with only one slide in it) will not have any position indicators in its top borders.

In a presentation, the user will normally proceed from one slide to the next slide in a chain. Typically, this is done in one of two ways, either by activating a button which has a button link with the Next command or by pressing a key on the keyboard which has been predefined to perform the Next command when the system is in Run View. If the Next command is selected and there are no more slides, the system will inform the user by, for example, a beep.

Presentations often consist of a number of topics. A user can categorize groups of slides to be associated with particular topics. To define each topic, the first slide of each topic can be identified using the Topic tool from the Tools menu and clicking on the desired slide. Slides so identified have the top border of their corresponding slide icon view, on the map, marked to represent the start of a topic.

During a presentation, a user can skip the rest of the slides associated with a topic and move on to the next topic. This can be done by activating a button that has a button link with a Next Topic button link command, or by using a key on the keyboard which is predefined to perform this function when in Run View. The system searches the Next Chain (starting at the slide next after the current slide) until it reaches the end of the Chain (or the current slide), looking for a slide that starts a topic, and displays that slide. If the Next Topic command is selected and there is not a Next Topic slide, the system will inform the user.

Another feature of the above-described system is a special graphical effect called a transition that is displayed when the user moves from one slide to another in Run View. Generally associated with a button link by selecting the button link or links with the Selection tool in Button View, a transition can be selected from a transition sub-menu in the Format menu. Some of the button link commands with which a transition can be associated include, Go To Map or Go To Slide n, Previous, Next Topic, and Pop-up Go To. A transition can also be specified for the source slide in the Next Chain when working on the map in Edit View. For example, a user can select the transition to be applied when moving from the slide at position 2 to the slide at position 3.

A Run command in the Presentation menu places the system in Run View where the first slide in a presentation is run, or the map is run if the no First Slide exists. However, self-running presentations can be created to allow the presenter to focus on delivery of the presentation.

A kiosk-style self-running-demonstration can be realized by the system. This type of self-running demonstration runs until a user activates a button that provides additional information. The user can browse additional information at will. When the user finishes, the system will wait a certain period of time and then return to the self-running operation. A series of self-running slides are linked together using the delay button techniques. The last slide of the series is next linked to the first slide of the series, and the slide sequences for additional information and buttons that go to these sections are created. Finally, in the Presentation menu, Get Presentation Info is entered and a Kiosk Delay is set. The user can access the additional information sequences by clicking on the appropriate buttons. After the user finishes browsing the additional information, the system, after the preset kiosk delay period expires, returns to the self-running operation.

Buttons can be added onto a portal such that an area of a data portal, when selected, i.e., by being activated or clicked where the button is located, can be altered such that text data, for example, appears in the button portal on top of the data portal. The example in FIG. 5 demonstrates this feature. Assuming a slide 200 is created, then a portal 210 is created. The command Place File is used to select and place, for example, a picture in the portal 210. The portal could then, using the command Resize Portal to Data, be made to be the same size as the data. Next three transparent portals 220, 230 and 240, (shown as dotted lines) are drawn over the areas on the picture that the user wants to function as buttons. Two additional data portals, 250 and 260, can be created to contain data that will be controlled by the buttons on the picture. In Button View, a button link 270 is drawn from portal 220 to 250 and data is placed in portal 250. The data the user desires will appear in the portal 250 when the button feature of portal 220 is activated. For example, text data can be placed in portal 250 when activated or a picture can be placed in the portal 250, depending on how the user has chosen to define the link. Likewise, the user can draw a button link (not shown) from one of the other portals on the picture to portal 260 and have another type of data appear.

The following description provides an overview of the system and describes a general approach to creating interactive slides.

First, lay out all portals on the screen using the Edit View. This includes portals for titles, bullets, text, imported data, and buttons. Create and position these portals on the screen. All data imported or created while in Edit View will be shown when the slide comes up while in Run View. Use the Portal menu, Adjust command, to align and resize selected portals. Use the Format menu, Font, Size, Style, Alignment, Foreground Color and Background Color to specify portals with text that will appear when the slide comes up.

To create buttons and interactivity, select Button View. Create button links to connect buttons to portals by using the Button tool and then specify data that will appear under button control. Use the Data menu, Resize Portal to Data, Clip Data to Portal, Scale Data to Portal, and Anchor, to define the portal and the position of the data in the portal.

To create text that will appear under button control, draw a button link from the button to the slave portal. Enter text and use the Format menu, Font, Size, Style, Alignment, and Foreground Color to specify portals with text that will appear when the controlling button is clicked.

The above-described system, although particularly adapted to the presentation field, can be extended to other types of control relationships. For example, the portals could be tied to a process control machine. Each portal could represent a different piece of machinery and one piece of machinery could control another piece of machinery. Such a control relationship would be defined by specifying the control linkage through the button links.

The above-described system overcomes thus provides a method whereby a user has increased system control in a user friendly graphical environment. With the system, a user can set up graphical control relationships between actions to be performed on data. Through interaction with the computer during the actual presentation, a user can immediately select any desired action to be performed. Thus, a user can easily-—and in real time—organize the timing and sequence of the presentation within the scope of the available actions. The system can be used by for example, a salesperson, trainer, executive or a teacher to effectively communicate with an audience.

The foregoing has described the principles, a preferred embodiment and modes of operation of the present invention. However, the invention should not be construed as limited to the particular embodiments discussed. Instead, the above-described embodiments should be regarded as illustrative rather than restrictive, and it should be appreciated that variations can be made in those embodiments by workers skilled in the art without departing from the scope of present invention as defined by the following claims.

What is claimed is:

1. A system for selecting, displaying and controlling multi-media objects in a computer environment for creating and running presentations of successive displaying of said multi-media objects, said objects comprising motion pictures, pictures, music, sound, and text characters, said system comprising:

user input means for interactively defining a plurality of portals, each of said plurality of portals being defined as one of two types of portals, each portal being defined in a region on a display screen, a first type comprising controlled elements that contain at least one of said multi-media objects and a second type comprising button portals for controlling, responsive to a selected function, the behavior of objects within said plurality of portals and for navigation within the presentation;

user input means for interactively placing at least one of said multi-media objects within at least one of said plurality of portals; and user input means for interactively designating one of said plurality of portals as a first one of said button portals having an associated function and for designating at least one other of said plurality of portals as one of said controlled elements to be operationally associated with said one of said button portals, wherein when said first one of said button portals is activated, the function associated therewith is performed to control said at least one object within at least one of said controlled elements operationally associated with said activated button portal and for interactively designating another one of said plurality of portals as a second one of said button portals having an associated navigation function wherein when said second one of said button portals is activated, the navigation function associated therewith is performed to control navigation between said plurality of portals during running of the presentation.

2. A method of selecting, displaying and controlling multi-media objects in a computer environment for creating and running presentations of successive displaying of said multi-media objects, said objects comprising motion pictures, pictures, music, sound, and text characters, said method comprising the steps of:

interactively defining a plurality of portals, each of said plurality of portals being defined as one of two types of portals, each portal being defined in a region on a display screen, a first type comprising controlled elements that contain at least one of said multi-media objects and a second type comprising button portals for controlling, responsive to a selected function, the behavior of objects within said plurality of portals and for navigation within the presentation;

interactively placing at least one of said multi-media objects within at least one of said plurality of portals;

interactively designating one of said plurality of portals as a first one of said button portals having an associated function and for designating at least one other of said plurality of portals as one of said controlled elements to be operationally associated with said one of said button portals, wherein when said first one of said button portals is activated, the function associated therewith is performed to control said at least one object within at least one of said controlled elements operationally associated with said activated button portal; and interactively designating another one of said plurality of portals as a second one of said button portals having an associated navigation function wherein when said second one of said button portals is activated, the navigation function associated therewith is performed to control navigation between said plurality of portals during running of the presentation.

3. The method of claim 2, wherein said step of interactively designating at least one other of said plurality of said portals as one of said controlled elements comprises the step of drawing an arrow between said first one of said button portals and said at least one other of said plurality of portals.

4. The method of claim 3, wherein the function associated with said first one of said button portals is designated by a label of the arrow.

5. The method of claim 3, wherein at least one of the style and color of the first portion of the arrow is associated with the said first one of said button portals, and at least one of the style and color of the second portion of the arrow is associated with said one of said controlled elements.

6. The method of claim 2, wherein the plurality of portals are differentiated by at least one of color and style.

7. The method of claim 2, wherein said first one of said button portals and said one of said controlled elements are defined in the same portal on the display screen.

8. The method of claim 7, wherein said first one of said button portals, and by definition, said one of said controlled elements are identified by at least one of color and style.

9. The method of claim 7, wherein said step of interactively designating at least one other of said plurality of said portals as one of said controlled elements comprises the step of drawing an arrow between said first one of said button portals and said at least one other of said plurality of portals.

10. The method of claim 9, wherein the function associated with said first one of said button portals is designated by a label of the arrow.

11. The method of claim 10, wherein at least one of the style and color of the arrow is associated with the at least one of the style and color of the said first one of said button portals and by definition, said one of said controlled elements.

12. The method of claim 2, further comprising the step of interactively designating one of said plurality of portals as both a third one of said button portals having an associated function and as another one of said controlled elements to be operationally associated with said third one of said button portals.

* * * * *